US006380295B1

(12) United States Patent
Ross et al.

(10) Patent No.: US 6,380,295 B1
(45) Date of Patent: Apr. 30, 2002

(54) CLAY/ORGANIC CHEMICAL COMPOSITIONS USEFUL AS ADDITIVES TO POLYMER, PLASTIC AND RESIN MATRICES TO PRODUCE NANOCOMPOSITES AND NANOCOMPOSITES CONTAINING SUCH COMPOSITIONS

(75) Inventors: Mark Ross, Newtown, PA (US); Jacob Kaizerman, Bradley Beach, NJ (US)

(73) Assignee: Rheox Inc., Hightstown, NJ (US)

( * ) Notice: Subject to any disclaimer, the term of this patent is extended or adjusted under 35 U.S.C. 154(b) by 0 days.

(21) Appl. No.: 09/064,216

(22) Filed: Apr. 22, 1998

(51) Int. Cl.$^7$ .................................................. C08K 3/34
(52) U.S. Cl. ...................................................... 524/443
(58) Field of Search .......................................... 524/443

(56) References Cited

U.S. PATENT DOCUMENTS

| | | | | |
|---|---|---|---|---|
| 5,726,113 A | * | 3/1998 | Pinnavaia | 502/62 |
| 5,747,560 A | * | 5/1998 | Christiani | 523/209 |
| 5,866,645 A | * | 2/1999 | Pinnavaia | 524/443 |
| 5,880,197 A | * | 3/1999 | Beall | 524/445 |
| 5,936,023 A | | 8/1999 | Kato et al. | |
| 6,034,163 A | | 3/2000 | Barbee et al. | |

FOREIGN PATENT DOCUMENTS

| WO | WO 97/00910 | 1/1997 |
|---|---|---|
| WO | WO 99/03914 | 1/1999 |

OTHER PUBLICATIONS

Shi et al., Interfacial Effects on the Reinforcement Properties of Polymer–Organoclay Nanocomposites, 1996, Chem. Material 1996, pp. 1584–1587.

Wang et al., Hybrid Organic–Inorganic Nanocomposites Formed from an Epoxy Polymer and a Layered Silicia Acid (Magadiite), 1996, Chem Material 1996, pp. 2200–2204.

Lan et al., Clay–Expoxy Nanocomposites: Relationships Between Reinforcement Properties and the Extent of Clay Layer Exfoliation, Proceedings of the ACS Div. of Polymeric Materials: Science and Engineering, vol. 71 1995.

* cited by examiner

*Primary Examiner*—Paul R. Michl
(74) *Attorney, Agent, or Firm*—Michael J. Cronin

(57) ABSTRACT

This invention is of a hybrid organoclay that consists of an organic chemical/phyllosilicate clay intercalate that has been ion-exchanged with quaternary ammonium compounds. Since this hybrid organoclay is hydrophobic, it can be washed in water to remove reaction salts and excess water soluble or water dispersible polymers to give a clean product via inexpensive means such as filtration. This allows a better dispersing composition to be prepared without the difficulties of isolation presented by prior art which uses energy intensive means to remove the bulk of the water from the final product and cannot be easily washed. In one aspect, the present invention provides a solid clay/chemical composition that comprises: (a) one or more smectite clays, (b) a quaternary ammonium compound which reacts via an ion exchange mechanism with the smectite clay, and (c) one or more non-anionic organic materials that intercalate with the clay. The invention is useful both as an ingredient to form nanocomposites and as a rheological additive.

16 Claims, No Drawings

CLAY/ORGANIC CHEMICAL
COMPOSITIONS USEFUL AS ADDITIVES TO
POLYMER, PLASTIC AND RESIN
MATRICES TO PRODUCE
NANOCOMPOSITES AND
NANOCOMPOSITES CONTAINING SUCH
COMPOSITIONS

BACKGROUND OF THE INVENTION

1. Field of the Invention

The present invention is directed to improved clay/organic chemical compositions that are made from clay and a specified mixture of organic materials. The compositions can be added to a wide variety of polymer, plastic and resin matrices to form inventive nanocomposite materials of enhanced structural strength. They can also be used as rheological additives.

2. Background of the Invention

Organically modified clays, also called organoclays, have been used for many years as rheological additives for solvent based systems. They are usually produced by making a water dispersion of a phyllosilicate clay, usually a smectite clay, and adding to it a quaternary ammonium salt of a long chain fatty acid to produce an organically modified clay by cation exchange reaction and adsorption. The reaction may cause the organoclay to coagulate from the water dispersion which allows for its isolation by filtration and washing. Similarly, organoclays can be made without water by extrusion mixing, with heat and shear, smectite clay and the quaternary ammonium compound or compounds with no water or other solvent being present. This process usually produces an organoclay of lower quality however, since, among other reasons, the final product still has salt reaction byproducts that cannot be washed or readily isolated from the organoclay and for other reasons.

Polymers, resins and plastics containing clay additives have recently become widely used as replacements for heavier steel and other metal products, especially in the field of automotive manufacturing. They have also found use in a growing number of other areas including as bridge components and as replacements for heavier steel parts in ship construction. Using extrusion and injection molding, a nylon matrix, for example, has been successfully reinforced with smectite-type clays (and organoclays based on the smectite clays, bentonite and hectorite) dispersed therein to form molecular composites of nylon and finely dispersed silicate clay platelet layers. Such products, often called nanocomposites, have enhanced structural, tensile, impact and flexural strength.

The behavior of the resultant plastic/clay product (or nanocomposite) is qualitatively different from that exhibited by the plastic, polymer or resin alone and has been attributed by some workers in the field to the confinement of the matrix chains between the clay's millions of microscopic layers. It has long been known that bentonite and hectorite are clays which are composed of flat silicate platelets of a thickness no more than about one nanometer.

The nanocomposite products created to date have important commercial applications not only in the synthesis and properties of organic/inorganic nano-structures as discussed above but also in diverse areas such as where ultrathin polymer films confined between adsorbed surfaces are involved. These uses include polymer composites for polymer adhesives and films including polyethylene.

The clays used are typically smectite clays which are layered phyllosilicates. Smectite clays possess some structural characteristics similar to the more well-known minerals talc and mica. Their crystal structures consist of two-dimensional layers formed by fusing two silica tetrahedral sheets to an edge-shared dioctahedral or trioctahedral sheet of either alumina (for example bentonite) or magnesia (for example hectorite)—each of the different smectite clays having somewhat different structures. Stacking of these layers in nature in depths of hundreds or more caused by ionic and weak Van der Waals forces leads to voids or chambers between the separate layers. These chambers are occupied by cations which balance the charge deficiency that is generated by isomorphous substitution (often called disharmonies) within the platelet lattices.

Nanocomposites are most often prepared today using organically modified silicates or organoclays produced by a cation exchange reaction between the silicate and an alkylammonium salt (usually quaternary ammonium compounds). The alkyl cations exchanged onto the natural clay platelets render the hydrophilic clay organophilic and this transformation makes the clay more easily dispersible into the polymer or plastic. Although excellent sorbents for some organics, natural bentonite and hectorite are themselves very hydrophilic.

DESCRIPTION OF THE PRIOR ART

The earliest scientific work using organoclays in the preparation of nanocomposites is reflected in U.S. Pat. No. 2,531,396, issued to a predecessor of Rheox, Inc., the assignee of this invention. This patent filed in 1947 teaches the use of organically modified bentonites to provide structural reinforcement to elastomers, such as rubber, polychloroprene and polyvinyl compounds. Over a generation later, additional patents begin to appear. A number of patents obtained by Toyota starting in 1984: U.S. Pat. Nos. 4,472,538; 4,739,007; 4,810,734; 4,889,885; and 5,091,462 use organoclay additives for plastics and describe plastic structures commercially used, for example, to replace steel components in automobiles.

While not related to nanocomposites, Rheox, Inc. has issued patents describing organoclay compositions useful as rheological additives which comprise the reaction product of smectite clay, quaternary ammonium compounds and organic anions wherein a quaternary-organic anion complex is intercalated with the smectite clay—see for example U.S. Pat. No. 4,412,018—organic anions are described to include a large variety of organic compounds, including carboxylic acids, capable of reacting with the quaternary used.

Manufacture to date of nanocomposite materials has often involved mixing an organoclay with a polymer powder, pressing the mixture into a pellet, and heating at the appropriate temperature. For example, polystyrene has been intercalated by mixing polystyrene with an alkylammonium montmorillonite and heating in vacuum. Temperature of heating is chosen to be above the bulk glass transition temperature of polystyrene ensuring polymer melt.

Representative U.S. Pat. No. 4,810,734 to Toyota describes a different process for producing a composite material which comprises a step of contacting a layered smectite clay mineral having a cation exchange capacity of up to 200 milliequivalents per 100 g with a swelling agent in the presence of a dispersion medium, thereby forming a complex which has the property of being swollen by a molten monomer of a polymer, and a polymerization step of polymerizing said monomer in said mixture. The "swelling agent" used is one which has both an onium ion and a functional group capable of reacting with a polymer. Toyota U.S. Pat. No. 4,889,885 describes a composite material, which comprises (a) at least one resin selected from the group consisting of a vinyl-based polymeric compound, a thermosetting resin and a rubber, and (b) a layered bentonite uniformly dispersed in the resin, the layered silicate having a layer thickness of about 7 to 12 Å and an interlayer distance of at least about 30 Å, where at least one resin is connected to a layered silicate through an intermediate.

There are a number of ECC America patents issued starting around 1987 where gaseous $NH_3$ is used to provide modification of the smectite clay surfaces prior to making a nanocomposite—See U.S. Pat. No. 4,690,868 and 4,798,766.

Two other major companies appear to be working in the field; Amcol International Corporation and AlliedSignal. Both have issued recent patents in the area of this invention. See for example AlliedSignal's U.S. Pat. Nos. 5,514,734 and 5,385,776—these patents are in general directed toward a nylon 6 matrix and clays using non-standard organic modifications. See also in this regard Vaia et al., the article entitled *Synthesis and Properties of Two-Dimensional Nano Structures By Direct Intercalation of Polymer Melts in Layered Silicates,* Chemical Materials 1993, 5, pages 1694–1696.

Amcol International Corporation (Amcol) has been issued as least three recent patents, U.S. Pat. Nos. 5,552,469, 5,578,672 and 5,698,627 which teach the exclusion from their clay-based nanocomposites of "onium ion" products (which would include most known commercial organoclays made with traditional quaternary ammonium compounds). See also Amcol U.S. Pat. No. 5,721,306.

Several patents of the Cornell Research Foundation have issued—U.S. Pat. Nos. 5,032,546, 5,032,547 and 5,554,670. One or more of these patents describe the use of organoclays made by the Southern Clay Corporation, Texas.

General Electric Company U.S. Pat. No. 5,530,052 describes silicate materials, including montmorillonite clays, modified with at least one heteroaromatic cation and used as additives to specified polymers to make nanocomposites.

Other prior art shows making polymer-clay intercalates directly by reaction of the monomers in the presence of clays. See *Interfacial Effects On The Reinforcement Properties Of Polymer Organoclay Nanocomposites,* H Shi, T Lan, T H Pinnavaia, Chemistry of Materials, 1996, pages 88 et seq.

Many of the products described in the prior art references described above have the problem that they are either easy to process and isolate, but are difficult to disperse in a matrix, or they have improved dispersing characteristics but are inconvenient to isolate when manufactured. Traditional organoclays manufactured from quaternary salts and smectite clays are easy to isolate and wash because the reaction of onium salts with ion-exchangeable clays form hydrophobic materials in water that can be conveniently filtered. These materials, however, do not have good compatibility with certain plastic materials.

Water soluble polymer-clay intercalates as described in U.S. Pat. No. 5,552,469, for example, can have good compatibility with polymer, resin and plastic materials, but to isolate the additive, one must boil off residual water in an energy intensive fashion. This process also has the potential to leave behind unintercalated polymer along with the clay-polymer intercalate for which there is no simple way of removal. Making a clay-monomer composition with subsequent polymerization can give a well dispersed system in the polymer. Unfortunately, this technique requires that an expensive polymerization train be dedicated to the process and plant contamination with clay can become an issue.

What has escaped scientists is an inexpensive way to make an organic/clay composition that can easily and economically be isolated in high purity and also can be simply processed into a polymer, plastic or resin matrix to form a nanocomposite.

OBJECT AND SUMMARY OF THE INVENTION

Object of the Invention

It is an object of the invention to provide a clay/organic chemical composition (which we also call a hybrid organoclay) that can be readily dispersed in plastic and polymer materials to make nanocomposites of improved structural strength.

It is a specific object of the invention to provide such a clay/organic chemical composition that can be readily made and provide use as a rheological additive.

It is a still further object of the invention to provide an inexpensive process to make the clay/organic chemical composition in a manner that can be isolated readily.

SUMMARY OF THE INVENTION

This invention is of a clay/organic chemical composition that consists of an organic chemical/smectite clay intercalate that has been ion-exchanged and reacted with one or more quaternary ammonium compounds. This composition is designated as a hybrid organoclay. Since such a hybrid organoclay is hydrophobic, it can be washed with water after manufacture to remove reaction salts and excess water soluble or water dispersible organic material to give a clean product via inexpensive means such as filtration. This allows a better dispersing composition to be prepared without the difficulties of isolation presented by prior art, which uses energy intensive means to remove the bulk of the water from the final product and cannot be easily washed.

In one aspect, the present invention provides a clay/organic chemical composition that comprises: (a) one or more smectite clays, (b) one or more quaternary ammonium compounds which react via an ion exchange mechanism with the clay, and (c) one or more defined non-anionic organic materials that are intercalated with the smectite clay.

Further advantages and features of the invention, as well as the scope, nature and utilization of the invention, will become apparent to those of ordinary skill in the art from the description of the preferred embodiment of the invention set forth below.

DESCRIPTION OF THE PREFERRED EMBODIMENTS

The clay/organic chemical compositions of this invention, which are also referred to as hybrid organoclays, may be made using a variety of materials and by a variety of methods disclosed hereafter, or which will appear obvious when the disclosure of this patent occurs. Applicants do not intend to limit the materials or methods of manufacture of such additives by the following descriptions.

One important aspect of the invention is a clay/organic chemical composition, i.e., a hybrid organoclay, comprising an ion-exchanged reaction product obtained by the intercalation and reaction of:

a) one or more smectite clays;

b) one or more quaternary ammonium compounds; and c) one or more non-anionic organic materials.

The latter two materials can be reacted and intercalated together, or in any order, with the smectite clay to produce an inventive composition which can be isolated, washed and filtered at low cost.

Clays useful for element a) are smectite clays. Such clays are swellable layered clays which contain individual platelets which increase their interlayer spacing upon application of either element b) or c). Useful swellable layered materials include phyllosilicates such as smectite clay minerals, e.g., montmorillonite, particularly sodium montmorillonite; bentonite; hectorite; saponite; stevensite; beidellite; and the like.

As used herein the term "interlayer spacing" refers to the distance between the internal faces of adjacent dry smectite clay platelet layers as they are assembled in the layered clay before any delamination takes place. The interlayer spacing is measured when the clay is dry; i.e., contains less than 3–6% by weight of water based on the dry weight of the material.

The clays which maybe used in the present invention are preferably smectite-type clays having a cationic exchange capacity of at least 50 milliequivalents per 100 grams of clay, 100% active clay basis, as determined by the well-known ammonium acetate or methylene blue methods. Preferred smectite materials are bentonite and hectorite clays particularly of the 2:1 type having a negative charge on the layers ranging from about 0.15 to about 0.9 charges per formula unit and a commensurate number of exchangeable metal cations in the interlayer spaces.

Smectite-type clays are well known in the art and are commercially available from a variety of sources. Prior to use in the invention, the clays may preferably be converted to the sodium form if they are not already in this form. This may be conveniently carried out by preparing an aqueous clay slurry and passing the slurry through a bed of cation exchange resin in the sodium form. Alternatively, the clay can be mixed with water and a soluble sodium compound, such as sodium carbonate, sodium hydroxide, etc., and the mixture sheared, such as with a pugmill or extruder.

Representative smectite clays useful in accordance with the present invention are the following:
Montmorillonite

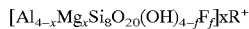
$[Al_{4-x}Mg_xSi_8O_{20}(OH)_{4-f}F_f]xR^+$ where $0.55 \leq x \leq 1.10$, $f \leq 4$ and R is selected from the group consisting of Na, Li, $NH_4$, and mixtures thereof;
Bentonite

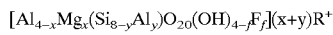
$[Al_{4-x}Mg_x(Si_{8-y}Al_y)O_{20}(OH)_{4-f}F_f](x+y)R^+$ where $0<x<1.10$, $0<y<1.10$, $0.55 \leq (x+y) \leq 1.10$, $f \leq 4$ and R is selected from the group consisting of Na, Li, $NH_4$, and mixtures thereof;
Hectorite

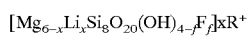
$[Mg_{6-x}Li_xSi_8O_{20}(OH)_{4-f}F_f]xR^+$ where $0.57 \leq x \leq 1.15$, $f \leq 4$ and R is selected from the group consisting of Na, Li, $NH_4$, and mixtures thereof,
Saponite

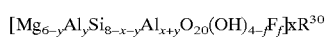
$[Mg_{6-y}Al_ySi_{8-x-y}Al_{x+y}O_{20}(OH)_{4-f}F_f]xR^{30}$ where $0.58 \leq x \leq 1.18$, $0 \leq y \leq 0.66$, $f \leq 4$ and R is selected from the group consisting of Na, Li, $NH_4$, and mixtures thereof; and
Stevensite

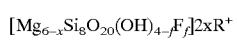
$[Mg_{6-x}Si_8O_{20}(OH)_{4-f}F_f]2xR^+$ where $0.28 \leq x \leq 0.57$, $f=4$ and R is selected from the group consisting of Na, Li, $NH_4$, mixtures thereof
Beidellite

$[Al_{4+y}(Si_{8-x-y}Al_{x+y})O_{20}(OH)_{4-f}F_f]xR^{30}$ where $0.55 \leq x \leq 1.10$, $0 \leq y \leq 0.44$, $f \leq 4$ and R is selected from the group consisting of Na, Li, $NH_4$, and mixtures thereof, The preferred clays used in the present invention are bentonite and hectorite. Bentonite and its properties are described at length in the chapter entitled "Bentonite," in Carr, D., ed. 1994, *Industrial Minerals and Rocks*, 6th Edition (published by the Society For Mining, Metallurgy and Exploration, Colorado).

It will be understood that both sheared and non-sheared forms of the above-listed smectite clays may be employed. In addition, the smectite clay employed can be either crude (containing gangue or non-clay material) or beneficiated (gangue removed). The ability to use crude clay in the smectite-type clay of this invention represents a substantial cost savings, since the clay beneficiation process and conversion to the sodium form do not have to be carried out.

Compound(s) b) of the invention is a quaternary ammonium compound(s) which include those having the formula:

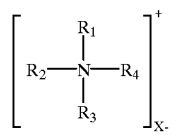

wherein $R_1$ comprises a group selected from (i) linear or branched aliphatic, aralkyl, or aromatic hydrocarbon groups having from 8 to 30 carbon atoms or (ii) alkyl or allyl-ester groups having 8 to 30 carbon atoms; $R_2$, $R_3$ and $R_4$ are independently selected from the group consisting of (a) linear or branched aliphatic, aralkyl and aromatic hydrocarbon, fluorocarbon or other halocarbon groups having from 1 to about 30 carbon atoms; (b) alkoxylated groups containing from 1 to about 80 moles of alkylene oxide; (c) amide groups, (d) oxazolidine groups, (e) allyl, vinyl, or other alkenyl or alkynyl groups possessing reactive unsaturation and (f) hydrogen; and $X^-$ comprises an anion selected from the group consisting of chloride, methyl sulfate, acetate, iodide and bromide, preferably chloride. For purposes of this invention, quaternary phosphonium and sulfonium based salts are defined as within the definition of quaternary ammonium compound.

The raw materials used to make the quaternary amonium compounds can be derived from natural oils such as tallow, soya, coconut and palm oil. Useful aliphatic groups in the above formula may be derived from other naturally occurring oils including various vegetable oils, such as corn oil, coconut oil, soybean oil, cottonseed oil, castor oil and the like, as well as various animal oils or fats. The aliphatic groups may likewise be petrochemically derived from, for example, alpha olefins. Representative examples of useful branched, saturated radicals included 12-methylstearyl and 12-ethylstearyl.

Examples of useful aromatic groups, that is benzyl and substituted benzyl moieties, include benzyl and benzylic-type materials derived from benzyl halides, benzhydryl halides, trityl halides,—halo-phenylalkanes wherein the alkyl chain has from 1 to 30 carbon atoms, such as 1-halo-1-phenyloctadecane; substituted benzyl moieties, such as those derived from ortho-, meta- and para-chlorobenzyl halides, para-methoxybenzyl halides, ortho-, meta- and para-nitrilobenzyl halides, and ortho-, meta- and para-alkylbenzyl halides wherein the alkyl chain contains from 1 to 30 carbon atoms; and fused ring benzyl-type moieties, such as those derived from 2-halomethylnaphthalene, 9-halomethylanthracene and 9-halomethylphenanthrene, wherein the halo group comprises chloro, bromo, or any other such group which serves as a leaving group in the nucleophilic attack of the benzyl type moiety such that the nucleophile replaces the leaving group on the benzyl type moiety.

Examples of other aromatic groups include aromatic-type substituents include phenyl and substituted phenyl, N-alkyl and N,N-dialkyl anilines, wherein the alkyl groups contain between 1 and 30 carbon atoms; ortho-, meta- and para-nitrophenyl, ortho-, meta- and para-alkyl phenyl, wherein the alkyl group contains between 1 and 30 carbon atoms, 2-,3-, and 4-halophenyl wherein the halo group is defined as chloro, bromo, or iodo, and 2-, 3-, and 4-carboxyphenyl and esters thereof where the alcohol of the ester is derived from an alkyl alcohol, wherein the alkyl group contains between 1 and 30 carbon atoms, aryl such as phenol, or aralkyl such as benzyl alcohols; and fused ring aryl moieties such as naphthalene, anthracene, and phenanthrene.

Some examples of preferred quaternary ammonium compounds to make the compositions of this invention are:

Dimethyl dihydrogenated tallow ammonium chloride (2M2HT):

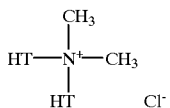

wherein HT=hydrogenated tallow.

Methyl bis[2-hydroxyethyl]stearyl ammonium chloride (M2HES):

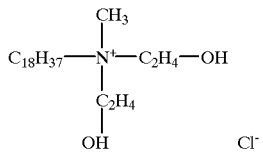

Dimethyl dibehenyl ammonium chloride:

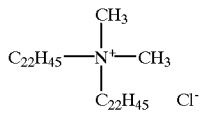

Methyl tris[hydrogenated tallow alkyl]chloride:

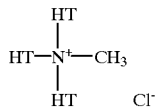

A preferred quaternary ammonium compound for purposes of the invention comprises a quaternary ammonium salt that contains at least one, preferably two or three, hydrocarbon chains having from about 8 to about 30 carbon atoms and either no hydrophilic carbon chains or having hydrophilic radicals having a total of about 9 moles of ethylene oxide or less.

It is necessary to have sufficient hydrophobicity in the alkyl chain on the salt to insure that the final product will be non-water dispersible. In general, it is necessary to have at least one of the alkyl chains at least 10 carbon atoms long for this to occur.

The preparation of the quaternary ammonium compounds utilized to make the hybrid organoclay inventive compositions can be carried out by techniques well-known in the art. For example, when preparing a quaternary ammonium salt, one skilled in the art would prepare a dialkyl secondary amine, for example, by the hydrogenation of nitriles (see U.S. Pat. No. 2,355,356), and then form the methyl dialkyl tertiary amine by reductive alkylations using formaldehyde as a source of the methyl radical.

Non-anionic organic materials useful for element c) can be selected from a wide variety of non-anionic materials which are either liquids or can be made into a liquid at reaction temperature so that the aforementioned clay materials absorbs them. Such absorption is often referred to as intercalation. These materials can be any of a wide range of materials and can have a wide range of molecular weights.

Materials suitable for element (c) of this invention include polyurethanes; polyamides; polyesters; polycarbonates; polyepoxides and polyolefins. Such materials also include polyethers (polymers and copolymers) based on ethylene oxide, butylene oxide, propylene oxide, phenols and bisphenols; polyesters (polymers and copolymers) based on aliphatic and aromatic diols and polyurethanes based on aliphatic and aromatic diisocyanates, polyamides (polymers and copolymers) based on aliphatic and aromatic diamines, and polycarbonates (polymers and copolymers) based on aliphatic or aromatic diols; polycarboimides (polymers and copolymers) based on tetrabasic acids and diamines, vinyl polymers and copolymers based on vinyl monomers, styrene and derivatives of styrene; acrylic polymers and copolymers based on acrylic monomers; copolymers based on styrene, vinyl and acrylic monomers; polyolefin polymers and copolymers based on ethylene, propylene and other alpha-olefin monomers; polymers and copolymers based on dienes, isobutylenes and the like; and copolymers based on dienes, styrene, acryl and vinyl monomers. The definition of element c) does not include quaternary ammonium compounds.

Specific preferred examples of useful non-anionic organic materials include THIXATROL VF-10 and THIXATROL VF-20 which are liquid polyester amide copolymers made by RHEOX. Examples of other specific materials are polyvinylpyrrolidone (PVP) or its hydrolysis product, polyvinyl alcohol (PVA), polymethacrylamide, poly(N,N-dimethylacrylamide), poly(N-isopropylacrylamide), poly(N-acetamidacryl amide), poly(N-acetimidomethacrylamide), polyvinyloxazolidone, and polyvinylmethyl oxazolidone, polyoxypropylene, polyoxyethylene and copolymers thereof.

At least two general methods can be used to make these hybrid organoclays. One is to first disperse the smectite clay in water. The clay is preferably dispersed in water at a concentration of from about 1 to 80%, most preferably from about 2 to 8% by weight. Optionally, the slurry may be centrifuged to remove non-clay impurities which constitute about 10% to 50% or the starting clay composition. The water soluble/dispersible non-anionic organic material is added to the clay/water dispersion and mixed until a clay-organic intercalate is formed. This mixture is then heated and ion exchanged with a quaternary ammonium compound to form the final hybrid organoclay as a coagulate, which is washed with water and isolated by filtration.

The second general method to prepare this invention uses dry clay that is intimately mixed with the non-anionic organic material in a heated device, such as an extruder. The mixture can also have some water present to facilitate intercalation. After the intercalation is complete, the quaternary ammonium compound is added and the final product is produced. This composition can be washed with water and dried.

Both of the methods mentioned above can be modified by either: 1) reversing the order of addition, i.e., react the clay with the quaternary ammonium ion followed by the non-anionic organic material; or 2) adding the quaternary ammonium compound and non-anionic organic material to the clay simultaneously.

The reaction is followed by drying and grinding the organoclay product. Other methods for making this invention can be postulated by those knowledgeable in the art.

The preferred amounts and types of clays, organic material and quaternary ammonium compound used to make the compositions of this invention will vary depending upon the type of matrix polymer that each composition is to be mixed into with the goal to achieve substantially complete exfoliation of the clay platelets in the matrix polymer. It is typical that the ratio of component (c) to component (a) clay will be at least 5:100 to 80:100 and more preferably 15:100 to 50:100. The ratio of component (b) to component (a) clay will be determined by the ability to make the final product sufficiently hydrophobic to allow for precipitation and convenient subsequent washing and filtration, as well as good incorporation in the polymer matrix. This will vary depending on the hydrophobicity of the carbon chains attached to the quaternary. Typically, 15 parts of organic cation, more typically 30 to 40 parts per 100 parts of clay are preferred.

A preferred clay/organic chemical composition for purposes of the instant invention comprises the reaction product of (a) a smectite-type clay having a cation exchange capacity of at least 50 milliequivalents per 100 grams of clay; and (b) one or more quaternary ammonium compounds in an amount of from about 40% to about 200% of the cation exchange capacity of the smectite-type clay and (c) one or more non-anionic organic materials.

The smectite-type clay can be sheared in slurry form prior to reaction with the quaternary ammonium salt, or treated in solid form with a pugmill or similar apparatus.

The composition can be used with base materials to make nanocomposites. Such base materials or matrices include almost all plastics, polymers and resins including resins based on formaldehyde and prepolymers thereof and alkyd resins based on dibasic aromatic acids and anhydrides, glycerol and carboxylic acids, as well as ureas, phenols and melamines. Some of such resins have in the past been used as coatings and have had prior art organoclays dispersed therein.

In addition, polyurethanes of all types produced from isocyanates, polyethers including polyethylene and polypropylene glycols, polyamines, polyamidoamines, polyesters including unsaturated polyesters, plastics based on styrene, vinyl, allyl and acrylic monomers, polyamides, polyolefins and polyimides can be made into nanocomposites by this invention. Polymers also include rubber products including thermoplastic and vulcanizable rubbers.

Preferred matrices are polymeric materials possessing polar functional groups including compounds with hydroxyl, urethane, ester, amide acid, ketone, aldehyde, halide, cyanide and thiol functionality.

Most preferred polymers are plastics which are homopolymers or copolymers of polyesters including linear polyesters, polyamides including nylon and most particularly nylon 6, polyethers, polycarbonates, polyacetal resins and mixtures and blends thereof.

The amount of the clay/chemical compositions of this invention dispersed into the above referenced polymers, resins and plastics to form the inventive nanocomposites varies depending on the particular matrix, its intended use, and the structural strength increase demanded. Preferred amounts are between 1% and 30% by weight of the nanocomposite with a most preferred range being between 3.5% and 12.0%.

For making nanocomposites, the clay/chemical compositions of this invention can be added by any means that can create sufficient shear for mixing. The shear can be provided by any appropriate method such as mechanical, thermal shock, pressure changes or ultrasonics as known in the art. Particularly useful are methods where a flowable polymer is mixed with the hybrid organoclay by mechanical means such as extruders, roll mills, stirrers, Banbury® type mixers, Brabender® type mixers and continuous mixers.

Nanocomposites that are made by these methods using the compositions of this invention will typically exhibit improved tensile modulus, tensile strength, gas barrier and heat distortion temperature values when sufficient energy is imparted to the blend to create substantially intercalated or exfoliated mixtures.

The clay/organic chemical compositions of this invention can also be used as rheological additives for liquid organic systems, such as paints and coatings, to provide viscosity modification and flow and leveling properties to such systems.

The following examples are given to illustrate the invention, but are not deemed to be limiting thereof. All percentages and ratios given throughout the specification are based upon weight, 100% weight basis, unless otherwise indicated.

EXAMPLE I

In a baffled three liter reactor with efficient stirring was placed 1350 g of a prehydrated aqueous hectorite clay slurry (concentration of clay=2.8%). The mixture was heated to 70–80° C. with stirring. Non-anionic organic materials, as shown below, at a level of 30% based on calculated clay weight were added to the slurry and stirred 15 minutes to effect intercalation. Sufficient alkyl quaternary ammonium compounds in 60 mL of isopropanol were added to react with 100% of the measured cation exchange capacity of the clay and the solution mixed at temperature for an additional 45 minutes.

The initial process used was addition of the non-anionic organic material to the clay slurry quickly as a single shot (Method 1). It was found that, in some cases, absorption was so rapid as to cause some clay to not have maximum possible intercalation. Where this was evident by X-Ray diffraction, new hybrid organoclays were prepared using a second method of manufacture Method 2). This method was addition of the non-anionic organic material slowly to the clay slurry.

The precipitated product was filtered on a large Buchner funnel and redispersed in 1 L of water at 70° C. to wash the hybrid clay. The final product was refiltered, dried at 65° C. in an oven to give a moisture content below 0.5% and ground to less than 325 mesh. A number of examples are shown in Table 1 showing the $d_{001}$ spacing measured using state of the art X-Ray diffraction measurement equipment.

TABLE 1

Hybrid Organoclays Prepared and Their Properties

| Run # | Clay | Non-Anionic Organic Material[4] | Commercial Name | Quaternary | Method | $d_{001}$ (Å) | $\Delta d_{001}$ (Å)[1] |
|---|---|---|---|---|---|---|---|
| 1 | Hectorite | p(vinylpyrrolidone/AA) | ACP-1005[5] | M2HES[3] | A | 22.86 | +4.49 |
| 2 | Hectorite | p(vinylmethylether/MA) | Gantrez AN119[5] | M2HES | A | 22.86 | +4.49 |
| 3 | Hectorite | p(vinylmethylether/MA) | Gantrez AN179[5] | M2HES | A | 21.14 | +2.77 |
| 4 | Hectorite | p(vinyl formal) | 50,000 MW | M2HES | A | 29.47 | +11.10 |

TABLE 1-continued

Hybrid Organoclays Prepared and Their Properties

| Run # | Clay | Non-Anionic Organic Material[4] | Commercial Name | Quaternary | Method | $d_{001}$ (Å) | $\Delta d_{001}$ (Å)[1] |
|---|---|---|---|---|---|---|---|
| 5 | Hectorite | p(ethylene oxide) | ca. 100,000 MW | M2HES | A | 27.48 | +9.11 |
| 6 | Hectorite | p(vinyl alcohol) | Airvol 523[6] | M2HES | A | 26.20 | +7.83 |
| 7 | Hectorite | p(ethylene glycol) | 8220 MW | M2HES | A | 21.97 | +3.60 |
| 8A | Hectorite | polyamide | THIXATROL VF-10[7] | 2M2HT | A | 36.11 | +10.65 |
| 8B | Hectorite | polyamide | THIXATROL VF-10[7] | 2M2HT | B | 40.0 | +14.5 |
| 9 | Hectorite | polyurethane | RHEOLATE 204[7] | 2M2HT | A | 33.92 | +8.47 |
| 10 | Hectorite | p(styrene/MA) | SMA 3000[8] | 2M2HT | A | 28.71 | +3.29 |
| 11 | Hectorite | p(dimethylsiloxane) | Antifoam 1400[9] | M2HES | A | 19.32 | +0.95 |
| 12 | Hectorite | p(dimethylsiloxane) | Antifoam B[9] | M2HES | A | 19.66 | +1.29 |
| 13 | Hectorite | polyacrylamide | 10,000 MW | 2M2HT | A | 31.10 | +12.73 |
| 14 | Hectorite | polyester amide | E1075/ADA/AEPD | M2HES | A | 40.69 | +22.60 |
| 15A | Hectorite | polyamide | THIXATROL VF-20[7] | M2HES | A | 43.88 | +25.51 |
| 15B | Hectorite | polyamide | THIXATROL VF-20[7] | M2HES | B | 40.0 | +21.6 |
| 16 | Hectorite | polyamide | Jef2000/E1004/NMG | M2HES | A | 36.11 | +17.74 |
| 17A | Hectorite | polyester | C15/E1004/E1040 | M2HES | A | 41.45 | +23.08 |
| 17B | Hectorite | polyester | C15/E1004/E1040 | M2HES | B | 40.0 | +21.6 |
| 18 | Hectorite | polyamide | EDA/HSA/E1040 | M2HES | A | 20.01 | +1.637 |
| 19 | Hectorite | polyamide | EDA/E1004/NMG | M2HES | A | 34.71 | +16.34 |
| 20A | Hectorite | polyester amide | C15/E1004/NMG | M2HES | A | 38.59 | +20.22 |
| 20B | Hectorite | polyester amide | C15/E1004/NMG | M2HES | B | 40.0 | +21.6 |
| 21 | Hectorite | polyester amide | C15/E1004/NMG | 2M2HT | B | 40.0 | +14.5 |
| 22 | Bentonite | p(ethylene oxide) | 600,000 MW | M2HES | B | 24.9 | +4.5 |
| 23 | Bentonite | polyamide | THIXATROL VF-10[7] | M2HES | B | 38.6 | +20.2 |
| 24 | Bentonite | polyester amide | C15/E1004/NMG | M2HES | B | 44.8 | +24.4 |

[1]Difference in $d_{001}$ spacing from control organoclay, i.e. organoclay made solely with a quaternary compound
[2]2M2HT = Dimethyldihydrogenated tallow ammonium chloride.
[3]M2HES = Methyl bis[(2-hydroxyethyl)]stearyl ammonium chloride.
[4]Monomers: Empol (Emory) 1075 - dimer diol, Empol 1004 - dimer acid, Empol 1040 - trimer acid, ADA - adipic acid, AEPD - aminoethylpropanediol, AA - acrylic acid, MA - maleic anhydride, Jef2000 - Jeffamine D2000 (Huntsman)-diamine, NMG - N-methylglucamine, C15 - Ethomeen C15 (Akzo) alkylaminopolyether, EDA - ethylenediamine, HSA - hydroxystearic acid.
[5]International Specialty Products (ISP).
[6]Air Products
[7]RHEOX commercial product
[8]ElfAtochem
[9]Dow Corning Description of Results Table 1 examples show that a variety of clay/organic chemical compositions cause increased $d_{001}$ spacing in the system tested and that the use of a non-anionic organic material plus a quaternary compound caused an increase in spacing over and above that caused by the quaternary alone ($\Delta d_{001}$ column).

EXAMPLE 2

Some of the compositions from Example 1 were selected at random and further tested to determine their ability to disperse in a thermoplastic polymer. PETG, a glycol modified polyester from Eastman Chemical, was used. The polyester was melted and worked on a roll mill at 350° F. for 2 minutes to form a melt and an amount of the compositions indicated on Table II was added to the polyester. The dispersion results obtained are indicated in Table II.

TABLE II

Hybrid Organoclay Dispersion in PETG

| Sample | Non-Anionic Organic Material | Method[1] | Hybrid Organoclay Loading[2] | Dispersion[3] |
|---|---|---|---|---|
| 5 | p(ethylene oxide) | A | 7.79% | Good |
| 7 | p(ethylene glycol) 8K MW | A | 7.16% | Very Good |
| 8A | THIXATROL VF-10 | A | 7.90% | Excellent |
| 8B | THIXATROL VF-10 | B | 7.62% | Excellent |
| 12 | p(dimethylsiloxane) | A | 7.16% | Good |
| 13 | polyacrylamide | A | 7.90% | Poor |
| 14 | E1075/ADA/AEPD | A | 7.16% | Fair |
| 15A | THIXATROL VF-20 | A | 7.16% | Fair |
| 15B | THIXATROL VF-20 | B | 7.03% | Very Good |
| 17A | C15/E1004/E1040 | A | 7.16% | Good |
| 17B | C15/E1004/E1040 | B | 7.03% | Very Good |
| 18 | EDA/HSA/E1040 | A | 7.16% | Fair |
| 19 | EDA/E1004/NMG | A | 7.16% | Very Good |
| 20A | C15/E1004/NMG | A | 7.16% | Excellent |
| 20B | C15/E1004/NMG | B | 7.03% | Excellent |
| 22 | p(ethylene oxide) 600,000 MW | B | 7.08% | Very Good |

[1]Refers to method employed for the preparation of the hybrid organoclay.
[2]Hybrid organoclay loading as a percentage of polymer weight.
[3]Dispersion is evaluated on a 1–5 scale from poor to excellent as measured by visual inspection and SEM/X-Ray microprobe. A rating of poor corresponds to a sample containing large clay segregates with no dispersed material, and excellent corresponds to a sample that contains no segregates and has clay material evenly dispersed throughout the polymer matrix.

Description of Results

It is clear that a wide variety of hybrid organoclay compositions prepared according to this invention gave varying satisfactory degrees of dispersion by both visual inspection and SEM/X-Ray probe measurements.

EXAMPLE 3

Several materials were prepared to compare with the hybrid organoclays the dispersibility in PETG resin of 1) traditional organoclays without intercalated polymer, and 2) clays containing intercalated polymer and no quaternary salt. The former materials were prepared as described in U.S. Pat. No. 4,105,578, and the latter by the procedure set forth below:

In a baffled three liter reactor with efficient stirring was placed 1350 g of a prehydrated aqueous hectorite or bentonite clay slurry (concentration of clay ca. 3.0%). The slurry was heated 70–80° C. with stirring and organic materials as shown below, at a level of 30% based on calculated clay weight, were added to the slurry. The mixture was then mixed at temperature for an additional 45 minutes and poured into a large stainless steel pan. The materials were oven fried at 65° C., followed by mastication, grinding, and sifting to provide a final product less than 325 mesh.

The materials were incorporated into PETG resin as described in Example 2 and their dispersion observed by visual inspection and SEM/X-Ray microprobe analysis. The results are indicated in Table III.

TABLE III

Comparative Dispersions

| Run # | Clay | Non-Anionic Organic Material | Commercial Name | Quaternary | Dispersion[1] |
|---|---|---|---|---|---|
| 1 | Hectorite | — | — | 2M2HT | Poor |
| 2 | Hectorite | — | — | M2HES | Poor |
| 3 | Bentonite | — | — | M2HES | Fair |
| 4 | Hectorite | polyester amine | C15/E1004/NMG | — | Poor |
| 5 | Hectorite | p(vinyl alcohol) | Airvol 523 | — | Poor |
| 6 | Bentonite | polyamide | THIXATROL VF-10[2] | — | Poor |
| 7 | Bentonite | p(ethylene glycol) | 20,000 MW | — | Poor |

[1]Dispersion ranked on a 1–5 scale (Poor, Fair, Good, Very Good, Excellent) by visual inspection and SEM/X-Ray microprobe.
[2]Rheox commercial product

Description of Results

The examples of Table III demonstrate that neither traditional organically modified clays nor non-quaternized clay intercalates dispersed as well in a polymer matrix as the inventive compositions.

EXAMPLE 4

The hybrid organoclay designated sample 21B (Example 1) was tested against a standard organoclay product, BENTONE 38, for efficiency as a rheological additive in coatings. The two materials were incorporated into a standard aromatic gloss alkyd enamel at 1.00% and their Brookfield and Stormer viscosities measured. The results are shown in Table IV.

TABLE IV

Hybrid Organoclay 21B vs. BENTONE 38[1] in Solvent Based Paint

| Material/Incorp. Method | Stormer Visc. (77° F., KU) | Brookfield Visc. (10 rpm, cP) |
|---|---|---|
| Blank | 74 | 550 |
| BENTONE 38/Dry Incorporation | 88 | 3040 |
| BENTONE 38/Xylene pregel | 90 | 3400 |
| Sample 21B/Dry Incorporation | 84 | 1760 |
| Sample 21B/Xylene pregel | 89 | 2400 |

[1]Rheox commercial product

Description of Results

While not as efficient as a standard organoclay in this particular example, Sample 21B provided enhanced viscosity to the enamel well within the effective range for rheological additives.

What is claimed is:

1. A clay/organic chemical composition useful as an additive to polymer, plastic and resin matrices to produce nanocomposites, comprising an ion-exchanged reaction product produced by the intercalation and reaction of:
    (a) one or more smectite clays;
    (b) one or more quaternary ammonium compounds in an amount of from about 100% to about 200% of the cation exchange capacity of the smectite clay; and
    (c) one or more non-anionic organic polymers;
    wherein one or more of the non-anionic organic polymers is selected from the group consisting of polyurethanes, polyamides, polyesters, polycarbonates, polyepoxides and polyolefins.

2. A clay/organic chemical composition useful as an additive to polymer, plastic and resin matrices to produce nanocomposites, comprising an ion-exchanged reaction product produced by the intercalation and reaction of;
    (a) one or more smectite clays;
    (b) one or more quaternary ammonium compounds in an amount of from about 100% to about 200% of the cation exchange capacity of the smectite clay; and
    (c) one or more non-anionic organic polymers,
    wherein one or more of the non-anionic organic polymers is water soluble and selected from the group consisting of polyvinylpyrrolidones and their hydrolysis products, polyvinyl alcohols, polymethacrylamides, poly(N,N-dimethylacryl amides), poly(N-isopropylacrylamides), poly(N-acetamidacryl amides), poly(N-acetimidomethacrylamides) polyvinyloxazolidones, polymethyl oxazolidones, polyoxypropylenes, polyoxyethylenes and copolymers thereof.

3. The composition of claim 1 or 2 wherein one or more of the smectite clays is selected from the group consisting of bentonite and hectorite.

4. The composition of claim 1 or 2 wherein one or more of the quaternary ammonium compounds has the formula;

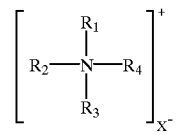

wherein $R_1$ comprises a group selected from (i) linear or branched aliphatic, aralkyl, or aromatic hydrocarbon groups having from 8 to 30 carbon atoms or (ii) alkyl or alkyl-ester groups having from 8 to 30 carbon atoms; $R_2$, $R_3$ and $R_4$ are independently selected from the group consisting of (a) linear or branched aliphatic, aralkyl and aromatic hydrocarbon, fluorocarbon or other halocarbon groups having from 1 to about 30 carbon atoms; (b) alkoxylated groups containing from 1 to about 80 moles of alkylene oxide; (c) amide groups; (d) oxazolidine groups, (e) allyl, vinyl, or other alkenyl or alkynyl groups possessing reactive unsaturation and (f) hydrogen; and $X^-$ comprises an anion selected from the group consisting of chloride, methyl sulfate, acetate, iodide and bromide.

5. The composition of claim 1 or 2 wherein one or more of the quaternary ammonium compounds comprises a quaternary ammonium compound that contains at least one hydrocarbon chains having from about 8 to about 30 carbon atoms and has either no hydrophilic carbon chains or has hydrophilic radicals having a total of about 9 moles of ethylene oxide or less.

6. The composition of claim 1 or 2 wherein one or more of the quaternary ammonium compounds is selected from the group consisting of 2M2HT and M2HES.

7. A nanocomposite comprising:
   (a) a matrix selected from the group consisting of polymer, plastic and resin compositions; and
   (b) a clay/organic chemical composition comprising an ion-exchanged reaction product produced by the intercalation and reaction of:
      (i) one or more smectite clays;
      (ii) one or more quaternary ammonium compounds in an amount of from about 100% to about 200% of the cation exchange capacity of the smectite clay; and
      (iii) one or more non-anionic organic polymers;
   wherein one or more of the non-anionic organic polymers is selected from the group consisting of polyurethanes, polyamides, polyesters, polycarbonates, polyepoxides and polyolefins.

8. The nanocomposite of claim 7 wherein the clay/chemical composition comprises between 1% and 30% by weight of the nanocomposite.

9. The nanocomposite of claim 8 wherein the clay/chemical composition comprises between 3.5% and 12.0% of the nanocomposite.

10. The nanocomposite of claim 7 wherein the matrix of paragraph (a) is selected from the group consisting of resins based on formaldehyde, alkyd resins, ureas, phenols, melamines, polyurethanes, polyesters and plastics based on styrene, vinyl, allyl and acrylic monomers, polyamides, polyolefins, polyimides, and rubbers.

11. The nanocomposite of claim 7 wherein the matrix of paragraph (a) is a plastic selected from the group consisting of homopolymers and copolymers of polyesters, polyamides, polyethers, polycarbonates, polyacetal resins and mixtures and blends thereof.

12. The nanocomposite of claim 7 wherein the matrix of paragraph (a), is a glycol modified polyester.

13. The nanocomposite of claim 7 wherein one or more of the smectite clays is selected from the group consisting of bentonite and hectorite.

14. The nanocomposite of claim 7 wherein one or more of the quaternary ammonium compounds has the formula:

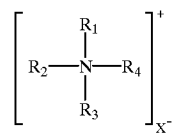

wherein $R_1$ comprises a group selected from (i) linear or branched aliphatic, aralkyl, or aromatic hydrocarbon groups having from 8 to 30 carbon atoms or (ii) alkyl or alkyl-ester groups having from 8 to 30 carbon atoms; $R_2$, $R_3$ and $R_4$ are independently selected from the group consisting of (a) linear or branched aliphatic, aralkyl and aromatic hydrocarbon, fluorocarbon or other halocarbon groups having from 1 to about 30 carbon atoms; (b) alkoxylated groups containing from 1 to about 80 moles of alkylene oxide; (c) amide groups; (d) oxazolidine groups, (e) allyl, vinyl, or other alkenyl or alkynyl groups possessing reactive unsaturation and (f) hydrogen; and $X^-$ comprises an anion selected from the group consisting of chloride, methyl sulfate, acetate, iodide and bromide.

15. The composition of claim 5 wherein one or more of the quaternary ammonium compounds comprises a quaternary ammonium compound that contains preferably two or three hydrocarbon chains having from about 8 to about 30 carbon atoms and has either no hydrophilic carbon chains or has hydrophilic radicals having a total of about 9 moles of ethylene oxide or less.

16. The nanocomposite of claim 11 wherein the polyesters include linear polyesters and the nylon is nylon 6.

* * * * *